United States Patent [19]
Bates et al.

[11] Patent Number: 5,385,179
[45] Date of Patent: Jan. 31, 1995

[54] NOZZLE RESTRICTOR ASSEMBLY

[75] Inventors: Dale Bates, Columbus; Daniel N. Smith, North Vernon; Richard F. Little, Columbus, all of Ind.

[73] Assignee: Pilot Industries, Inc., Dexter, Mich.

[21] Appl. No.: 56,835

[22] Filed: May 3, 1993

Related U.S. Application Data

[62] Division of Ser. No. 754,531, Sep. 4, 1991, Pat. No. 5,212,864.

[51] Int. Cl.⁶ .................................................. B67C 3/34
[52] U.S. Cl. .................................... 141/312; 141/286; 141/346; 141/350; 220/86.2; 220/746
[58] Field of Search ............... 141/286, 312, 335, 344, 141/346, 350; 220/86.2, 746

[56] References Cited

U.S. PATENT DOCUMENTS

| | | | |
|---|---|---|---|
| 641,028 | 1/1900 | Meehan | 220/86.2 |
| 721,853 | 3/1903 | Bauer | 220/86.2 |
| 1,280,047 | 9/1918 | Kurtz | 220/86.2 |
| 3,979,010 | 9/1976 | Fiedler | 220/86 R |
| 4,185,844 | 1/1980 | Hubbard et al. | 220/86.2 |
| 4,248,279 | 2/1981 | Warmbold | 220/86.2 |
| 4,527,601 | 7/1985 | Middleton et al. | 220/86.2 |
| 4,529,097 | 7/1985 | Larson | 220/86 R |
| 4,560,084 | 12/1985 | Wolfson | 220/359 |
| 4,733,791 | 3/1988 | Sinclair | 220/86.2 |

*Primary Examiner*—Henry J. Recla
*Assistant Examiner*—Steven O. Douglas
*Attorney, Agent, or Firm*—Gifford, Krass, Groh, Sprinkle, Patmore, Anderson & Citkowski

[57] ABSTRACT

A method is provided for installing a nozzle restrictor assembly in a fuel filler tube. The method comprises the steps of attaching a restrictor plate to an inner surface of the fuel filler tube, coating the restrictor plate and the fuel filler tube, and inserting a closure plate through a first slot formed in the restrictor plate so that the closure plate is positioned to block the opening. A nozzle restrictor assembly is also provided which comprises a restrictor plate sized for insertion into a fuel filler tube and a mechanism for selectively closing an opening formed in the restrictor plate upon withdrawal of a fuel filler nozzle.

70 Claims, 4 Drawing Sheets

NOZZLE RESTRICTOR ASSEMBLY

This is a division of application Ser. No. 07/754,531 filed Sep. 4, 1991, now U.S. Pat. No. 5,212,864.

BACKGROUND AND SUMMARY OF THE INVENTION

The present invention relates to a nozzle restrictor assembly for a fuel filler tube of a vehicle or the like and a method for installing a nozzle restrictor assembly in a fuel filler tube. More particularly, the present invention relates to a restrictor assembly designed to simplify the manufacturing process for fuel filler tubes, particularly with respect to protective coating operations.

Vehicle fuel filler tubes typically include nozzle restrictor assemblies at or near the inlet end thereof. The restrictor assemblies are designed to prevent passage of large diameter fuel filler nozzles into the fuel filler tube. Many consumers accustomed to pumping gasoline at a self service filling station have noticed that large diameter nozzles are always provided on pumps that dispense leaded fuel while small diameter nozzles are always provided on pumps that dispense unleaded fuel.

A restrictor assembly is designed so that fuel filler nozzles dispensing leaded fuel have a nozzle diameter too large to pass through the nozzle-receiving aperture that is formed in the restrictor assembly, thus compelling a user to switch to a small diameter nozzle on an unleaded fuel pump and follow requirements to use unleaded fuel. Such a restrictor assembly typically includes a threaded cup mounted in the filler neck and formed to include a small diameter opening for receiving the small diameter fuel filler nozzle and a spring deflector for normally covering the opening.

In current manufacturing processes for fuel filler tubes, the filler tube is coated with a protective coating prior to the installation of the restrictor assembly. The various components of the restrictor assembly must be assembled off-line and coated separately from the fuel filler tube. The pre-coated restrictor assembly is then pressed into the pre-coated fuel filler tube.

Generally, the fuel cap, when installed on the fuel filler tube, provides a barrier to fuel vapor leakage. However, for restrictor assemblies using a threaded cup, the fuel cap is threaded into the threaded cup and does not seal the joint between the threaded cup and the inner wall of the fuel filler tube. Accordingly, the joint between the restrictor assembly and the filler neck must be carefully sealed during an extra sealing operation to prevent leakage of fuel vapor through the joint between the pre-coated restrictor assembly and the inner wall of the pre-coated fuel filler tube.

The type of extra sealing operation employed to seal conventional restrictor assemblies is dependent upon the type of protective coating which has been applied to the restrictor assembly and the fuel filler tube. Where the protective coating is a lead/tin dip coating or the like, sealing is accomplished by soldering the restrictor assembly to the fuel filler tube. Where the protective coating is paint, sealing is accomplished by the use of O-rings or adhesives. In either case, minor imperfections in the sealing medium or its method of application can cause unacceptable fuel vapor leakage through the joint between the conventional restrictor assembly and the fuel filler tube.

According to the present invention, a method is provided for installing a restrictor assembly in a fuel filler tube. The method comprises the steps of providing a restrictor plate formed to include an opening allowing passage of a fuel filler nozzle therethrough and a slot, attaching the restrictor plate to an inner wall of the fuel filler tube, coating the restrictor plate and the fuel filler tube, and inserting a closure plate through the slot to block the opening and provide a restrictor assembly inside the fuel filler tube.

Preferably, the coating step is performed before the inserting step. Using this method, the fuel filler tube and the restrictor plate are coated in a single step to seal any joint between the tube and plate after the restrictor plate has been attached to the inner wall of the fuel filler tube. Advantageously, all moving parts of the restrictor assembly (such as the closure plate) are mounted on the restrictor plate after the restrictor plate and the fuel filler tube have been properly coated.

In preferred embodiments, one portion of the closure member is inserted through the slot formed in the restrictor plate and another portion of the closure plate is pivoted to lock into place in engagement with the restrictor plate. Once properly assembled, the closure plate bears against a side of the restrictor plate facing away from the user and toward the vehicle fuel tank to cover the nozzle-receiving opening.

The present invention also provides an apparatus facilitating simplified and efficient assembly as heretofore described. The nozzle restrictor assembly of the present invention includes a restrictor plate formed to include an opening allowing passage of a fuel filler nozzle therethrough and means for selectively closing the opening upon withdrawal of the fuel filler nozzle. The restrictor plate is formed to include a slot and the closing means is sized for insertion through the slot.

Additional objects, features, and advantages of the invention will become apparent to those skilled in the art upon consideration of the following detailed description of preferred embodiments exemplifying the best mode of carrying out the invention as presently perceived by the inventor.

BRIEF DESCRIPTION OF THE DRAWINGS

The detailed description particularly refers to the accompanying figures in which.

DETAILED DESCRIPTION OF THE DRAWINGS

Figure 1:
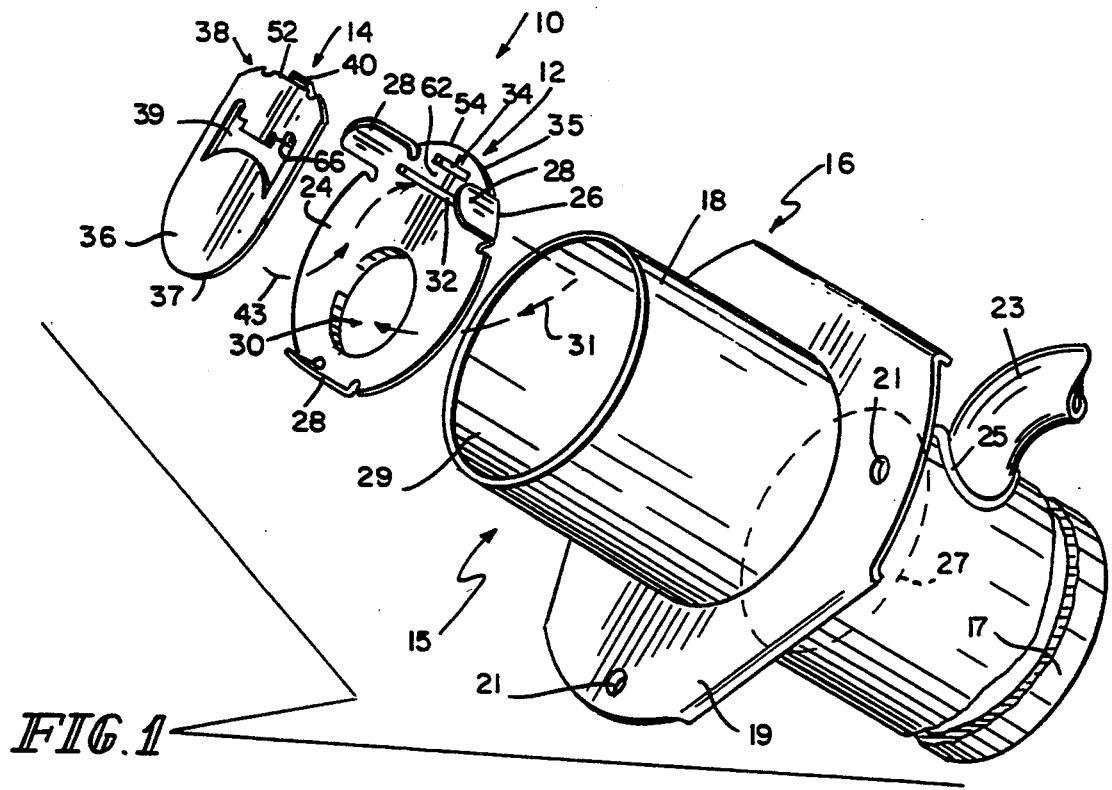
FIG. 1 is an exploded assembly view of a restrictor assembly in accordance with the present invention showing an unassembled closure plate, restrictor plate, and a fuel filler tube in which the restrictor assembly can be installed for use.

A nozzle restrictor assembly for use in accordance with the method of the present invention is illustrated in FIG. 1. As shown, a nozzle restrictor assembly 10 includes a restrictor plate 12 providing a nozzle opening 30 for receiving a properly sized fuel-dispensing nozzle therein and a closure plate 14 serving to normally cover opening 30. Restrictor assembly 10 is configured for mounting in a fuel filler tube 16 and functions to prevent a user from inserting one of the larger diameter nozzles used to dispense leaded fuels into the fuel filler tube 16.

Fuel filler tube 16, shown in fragment in FIG. 1, includes a cylinder 15 having an inner end 17 attached to a vehicle fuel tank (not shown) and an outer end 18 configured to receive a fuel cap (not shown). Outer end 18 includes a curled-back rim 20 (shown in FIG. 2) which provides a seat for the fuel cap.

Figure 2:
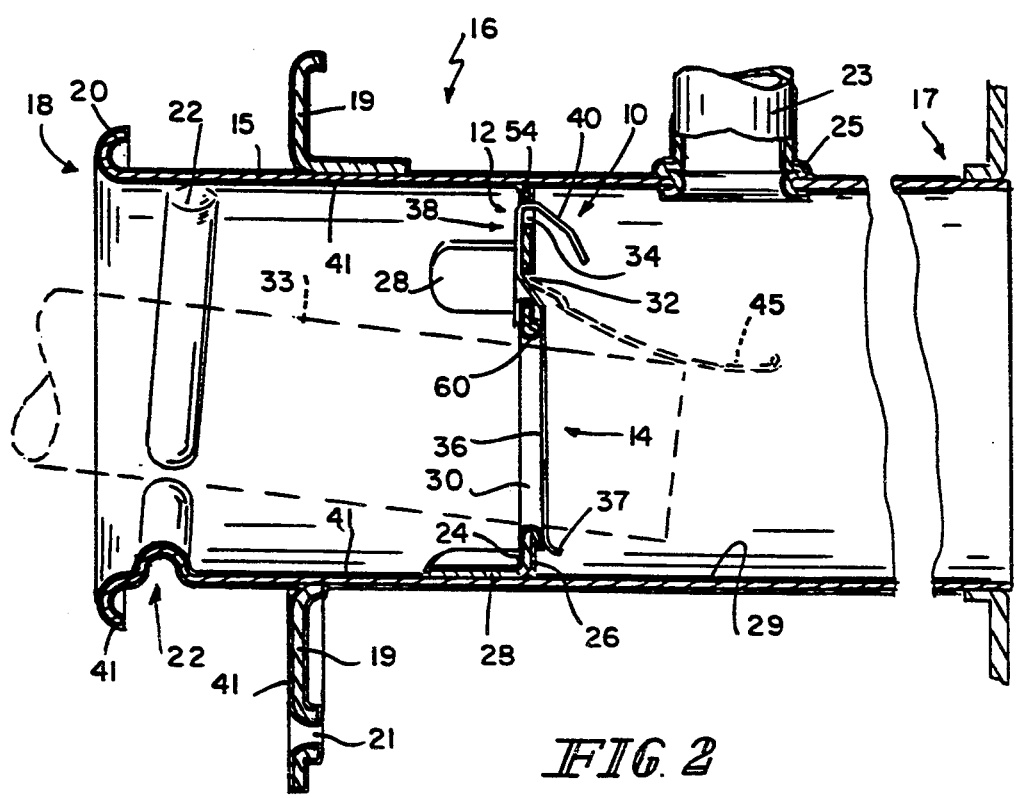
FIG. 2 is a sectional view of a fuel filler tube containing a nozzle restrictor assembly in accordance with the present invention showing the displacement of a portion of the closure plate to an open position (dotted lines) in response to insertion of a fuel filler nozzle and to a closed position (solid lines) in response to withdrawal of the fuel filler nozzle.

Fuel filler tube 16 is also provided with a mounting plate 19 formed to include openings 21 for receiving rivets or other fasteners for mounting fuel filler tube 16 to a vehicle. Fuel filler tube 16 also includes a tube 23 for venting fuel vapor as the vehicle fuel tank 13 fills with gasoline. Referring to FIG. 2, tube 23 includes a crimped end 25 for attachment to fuel filler tube 16 at a location inside the region in the cylinder 15 between the fuel tank 13 and the nozzle restrictor assembly 10. Cylinder 15 also includes an inner wall 29 to which nozzle restrictor assembly 10 is attached. A layer of protective coating 41 is applied to fuel filler tube 16 and restrictor plate 12 as will be described.

As shown in FIG. 2, threads 22 are formed directly in cylinder 15 near outlet end 18 after the nozzle restrictor assembly 10 has been mounted inside the fuel filler tube 16. A fuel cap (not shown) provided with appropriate threading can engage threads 22 and seal against rim 20 to substantially prevent the escape of liquid fuel and fuel vapors from fuel filler tube 16 to the atmosphere. Restrictor plate 12 includes a first side 24 facing toward outer end 18 and a second side 26 facing into the filler tube 16 toward fuel tank 13.

Restrictor plate 12 also includes a plurality of upstanding ears 28 spaced about its periphery as shown best in FIG. 1. Although three such ears 28 are shown in the illustrated embodiment, alternative designs are contemplated within the scope of the present invention. Ears 28 provide surfaces for spot welding restrictor plate 12 to inner wall 29 during assembly of restrictor assembly 10 into fuel filler tube 16 as described below. When assembled, restrictor plate 12 occupies the axial position inside cylinder 15 represented by dotted circle 27 in FIG. 1.

Figure 6:
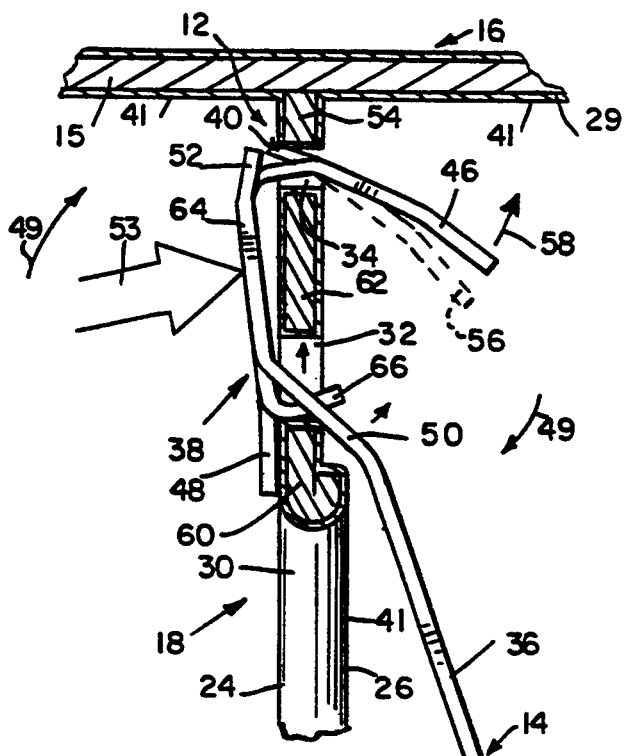
FIG. 6 is a further enlarged view of the restrictor assembly of FIG. 2 showing pivoting movement of a locking portion of the closure plate relative to the fixed restrictor plate to place a locking tab on the closure plate into a locking position engaging the coated nozzle restrictor plate.

As noted, restrictor plate 12 is formed to include nozzle opening 30 for receiving a fuel filler nozzle 33 during refueling. Opening 30 is provided with a diameter selected to admit only unleaded fuel-dispensing nozzles such as nozzle 33 and to block admission of conventional larger diameter leaded fuel-dispensing nozzles (not shown). Opening 30 is normally covered or closed by closure plate 14 at times other than during refueling as shown in FIG. 6, as will be described below.

Figure 4:
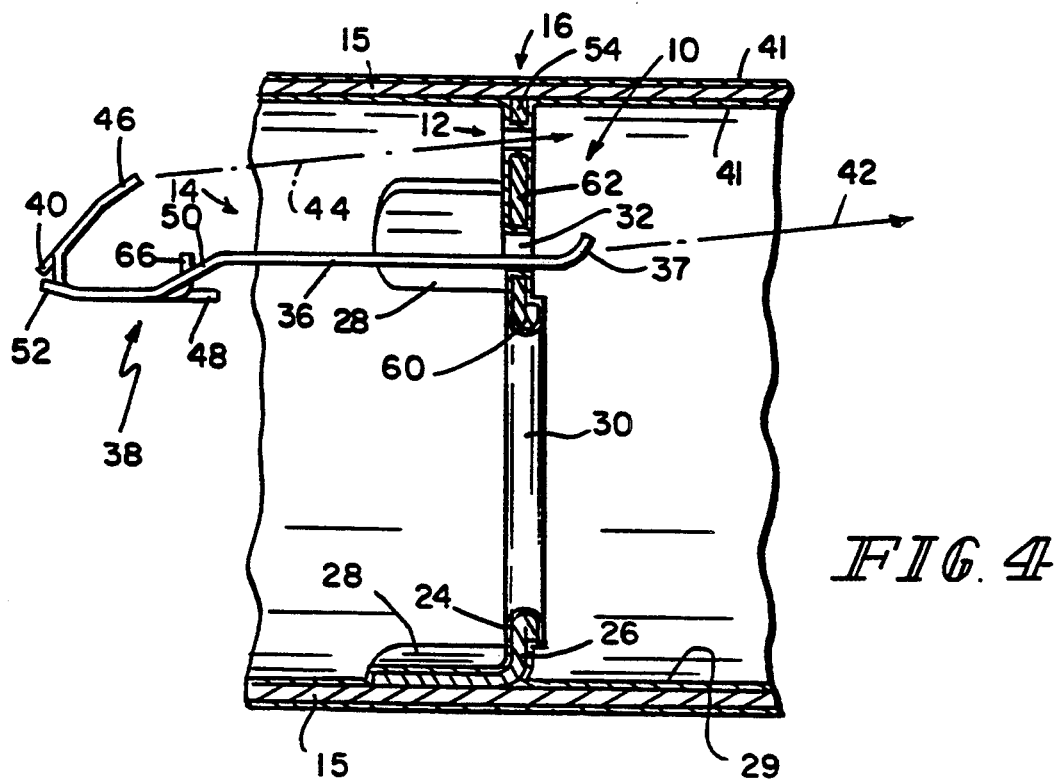
FIG. 4 is a view of the fuel filler tube of FIG. 1 showing the insertion of the closure plate into a slot formed in the coated nozzle restrictor plate during assembly operations in accordance with the method of the present invention.
Figure 5:
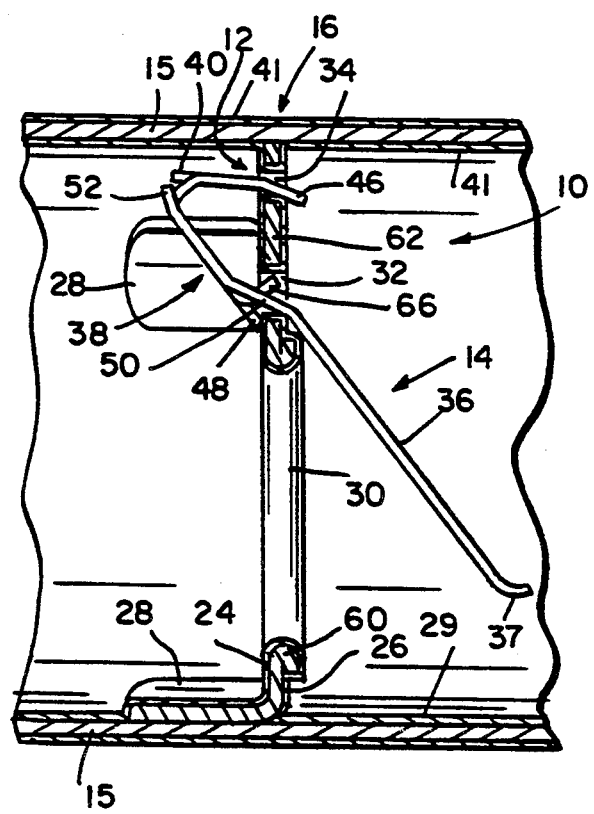
FIG. 5 is a view similar to FIG. 3 showing the insertion of a locking tab on the closure plate into a second slot formed in the coated nozzle restrictor plate in accordance with the method of the present invention.

Restrictor plate 12 also is formed to include a first slot 32 formed to lie adjacent to opening 30 and a second slot 34 formed to lie between first slot 32 and the perimeter edge 35 of the restrictor plate 12. Slots 32 and 34 are sized and positioned to receive portions of closure plate 14 as shown in FIGS. 4-6. As will be subsequently described in greater detail, one portion of closure plate 14 is inserted in slot 32 (as indicated by dotted arrow 43 in FIG. 1) and another portion of closure plate 14 is pivoted (as indicated by dotted arrow 31) to close nozzle opening 30.

Closure plate 14 is preferably fashioned of resilient stainless steel or other spring material and includes a closure portion 36, a hinge or spring portion 50, and a locking portion 38. Closure plate 14 is advantageously sized for insertion through first slot 32 so that closure portion 36 bears against the inner side 26 of restrictor plate 12 as shown, for example, in solid lines in FIG. 2. When mounted on restrictor plate 12, closure plate 14 serves as a means for closing nozzle opening 30 upon withdrawal of a fuel filler nozzle 33 (shown in dotted lines in FIG. 2), for example, at the completion of refueling.

Figure 7:
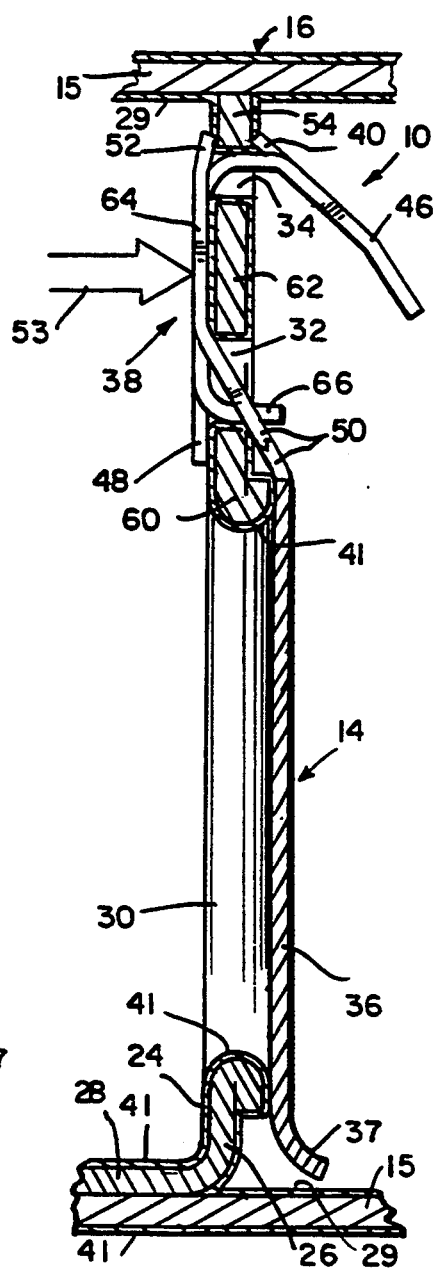
FIG. 7 is a view similar to FIG. 5 yet further enlarged showing the closure plate locked to the coated nozzle restrictor plate with the locking tab bearing against the restrictor plate and the closure portion moved to cover the nozzle-receiving opening formed in the restrictor plate.

Closure portion 36 of closure plate 14 normally covers nozzle opening 30 as shown best in FIG. 2 and FIG. 7. Closure portion 36 has a curved distal end 37.

Locking portion 38, as shown, for example, in FIGS. 4-7, includes a locking tab 40 having a bent distal end 46. Locking tab is advantageously sized for insertion through second slot 34. Locking portion 38 also includes a depending tab 48, an upstanding tab 52, and a support tab 66 extending generally perpendicular to depending tab 48. When closure plate 14 is coupled to restrictor plate 12, locking tab 40 bears against side 26 of restrictor plate 12 and tabs 48, 52 bear against side 24 of restrictor plate 12. Locking tab 40 cooperates with upstanding tab 52 to grip a radially outer portion 54 of restrictor plate 12 as shown in FIG. 7. Outer portion 54 is located between second slot 34 and the perimeter edge 35 of plate 12. Thus, locking tab 40 provides means for coupling closure portion 36 to restrictor plate 12 so that closure portion 36 is deflectable relative to restrictor plate 12 to move away from nozzle opening 30 during refueling upon insertion of a fuel filler nozzle 33. Specifically, closure plate 14 bends to occupy a deflected position 35 (shown in dotted lines in FIG. 2) but is movable to close nozzle opening 30 upon withdrawal of fuel filler nozzle 33.

Spring portion 50, shown best in FIGS. 5-7, allows displacement of closure portion 36 away from nozzle opening 30 upon insertion of a small diameter unleaded fuel filler nozzle 33 into nozzle opening 30. Spring portion 50 connects locking portion 38 and closure portion 36 and extends through slot 32 when closure plate 14 is coupled to restrictor plate 12 as shown best in FIGS. 6-7.

A method for mounting restrictor assembly 10 in a fuel filler tube 16 in accordance with the present invention is illustrated in FIGS. 3-6. First, restrictor plate 12 is attached to inner surface 29 of cylinder 15. Specifically, ears 28 at the outside edge 35 of restrictor plate 12 are spot welded to inner surface 29 of the fuel filler tube 16 so that the outer surface 24 of restrictor plate 12 lies approximately 1.5 inches (3.8 cm) from outer end 18. Thus, advantageously, the joints where ears 28 attach to inner wall 29 are not exposed to the atmosphere when the fuel cap (not shown) is attached to the outer end 18, but rather lie well within fuel filler tube 16. Any fuel vapor leaking through such joints during operation of the vehicle with the fuel cap installed on fuel filler tube 16 (or passing through openings in restrictor plate 12) will be trapped by the fuel cap, because the fuel cap is threaded directly into sealed engagement with threads 22 on inner wall 29 of fuel filler tube 16.

After restrictor plate 12 has been attached to cylinder 15, threads 22 are crimp-formed in cylinder 15 at outer end 18 using a hydraulic thread-sizing machine to perform a three-segment threading technique. In addition, curled-back rim 20 is formed at end 18 using a press operation to provide a flat sealing surface for a fuel cap (not shown).

Figure 3:
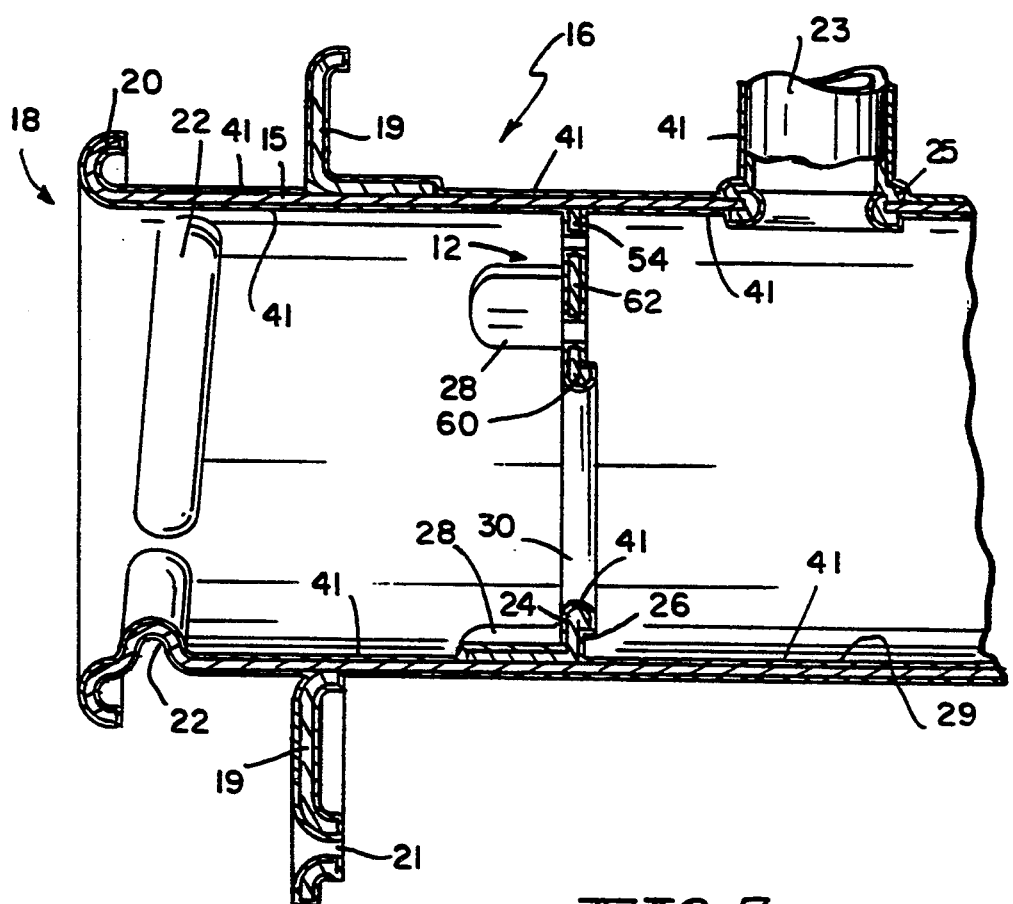
FIG. 3 is an enlarged sectional view of the fuel filler tube of FIG. 1 showing a layer of coating applied to the nozzle restrictor plate and the fuel filler tube.

Following the thread-forming step, tube 16 and the restrictor plate 12 mounted therein are dip-coated with a protective coating 41 as shown in FIG. 3 to inhibit development of rust on the tube 16 and nozzle restrictor plate 12. The thickness of the coating 41 in FIG. 3 is illustrative only. It will be appreciated by those of ordinary skill in the art that coating 41 is a very thin layer as is typically achieved through a standard dipcoating process. A variety of coatings may be used, including paint, zinc, or a lead/tin coating. Advantageously, tube 16 is dipped into the coating bath after restrictor plate 12 has been attached to fuel filler tube 16 so that the restrictor plate 12 and fuel filler tube 16 are coated in a single step.

Advantageously, closure plate 14 can be inserted through first slot 32 after restrictor plate 12 has been mounted in fuel filler tube 16 and coated with coating 41. The insertion sequence is illustrated in FIGS. 4-7. As shown in FIG. 4, the relatively long closure portion 36 is first inserted through first slot 32, proceeding from outer side 24 of plate 12 into fuel filler tube 16 in the direction indicated by arrow 42 from left to right in FIG. 4. This inward movement of closure plate 14 ultimately causes bent distal end 46 to move in the direction indicated by arrow 44 as shown in FIG. 4 and enter the second slot 34 as shown in FIG. 5.

Depending tab 48 moves to engage an inner segment 60 of the outer side 24 of plate 12 when the full extent of closure portion 36 has been inserted through slot 32 as shown in FIG. 5. Closure plate 14 will begin to pivot relative to the fixed restrictor plate 12 in direction 49 as shown in FIG. 6, with depending tab 48 serving as a pivot point. Such pivoting movement in direction 49 is a result of applying a force represented by arrow 53 to the spring portion 38 of spring plate 14 while inner segment 60 of restrictor plate 12 is "nested" in the space between tabs 48, 66.

As rotation in the direction of arrow 49 continues, locking tab 40 moves to engage the radially outer segment 54 of restrictor plate 12 as shown in FIG. 6. Locking tab 40 and bent distal end 46 are biased or cammed from their original position 56 (shown in dotted lines) to the position shown in solid as indicated by arrow 58.

The biasing force results from the compression of spring portion 50 and locking tab 40 as they are rotated in respective slots 32 and 34.

When pivoting movement of closure plate 14 relative to restrictor plate 12 is complete, closure plate 14 is placed in its operating position as shown in FIG. 7. As shown, radially outer segment 54 of restrictor plate 12 is trapped between locking tab 40 and upstanding tab 52 of spring plate 14. Inner segment 60 of restrictor plate 12 is trapped between depending tab 48 and spring portion 50 of closure plate 14. Depending tab 48 bears directly against outer side 24 of plate 12. Spring portion 50 extends through first slot 32 and bears against the inner segment 60. A central portion 64 of closure plate 14 bears against a central segment 62 of restrictor plate 12.

Spring portion 50 extends through first slot 32 at an angle. When fuel filler nozzle 33 is inserted through nozzle opening 30, the nozzle 33 pushes closure portion 36 away from opening 30. Spring portion 50 bends to provide a hinge action, allowing closure portion 36 to move away from opening 30, as shown, for example, in FIG. 12 in dotted lines.

Locking tab 40 bears against inner side 26 of restrictor plate 12 as shown in FIG. 7. The combined effects of locking tab 40 bearing against inner side 26 and tabs 48 and 52 bearing against outer side 24 ensure that closure plate 14 will remain attached to restrictor plate 12 even when closure portion 36 is forced away from opening 30 as during refueling.

Figure 8:
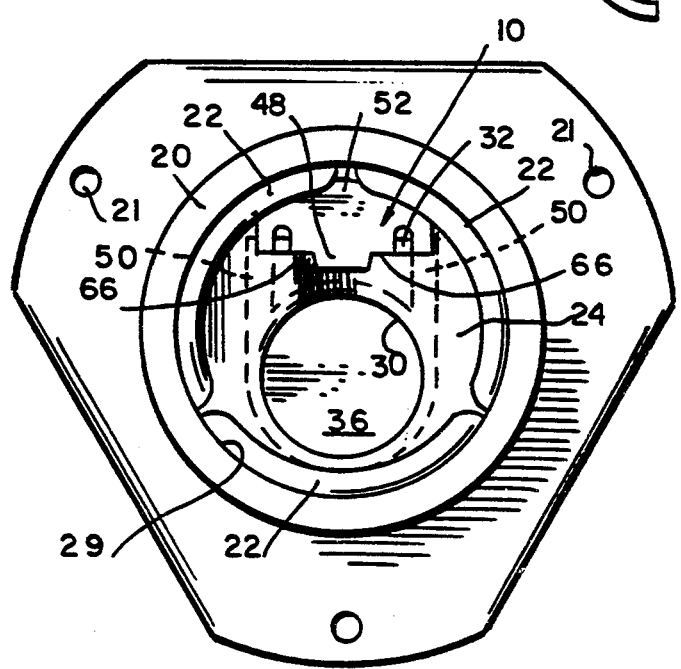
FIG. 8 is a top view of the restrictor assembly installed in a fuel filler tube shown in FIG. 2 as it would appear to a user who has removed the fuel cap from the fuel filler tube.

In FIG. 8, restrictor assembly 10 is shown as it would appear to a user preparing to refuel a fuel tank. Closure plate 14 is shown in its position blocking opening 30.

Although the invention has been described in detail with reference to certain preferred embodiments, variations and modifications exist within the scope and spirit of the invention as described and defined in the following claims.

What is claimed is:

1. A restrictor assembly for a fuel filler tube, the restrictor assembly comprising:
   a restrictor plate sized for insertion into the fuel filler tube having an outer end configured to receive a fuel cap and an opposite inner end, the restrictor plate being formed to include aperture means for allowing passage of a fuel filler nozzle therethrough during refueling and a first slot, a first side facing said outer end of said fuel filler tube and an opposite second side, and
   means for closing the aperture means upon withdrawal of the fuel filler nozzle said closing means having a first and second end portion residing between said second side of said restrictor plate and said inner end of said fuel filler tube, and a middle portion residing between said first side of said restrictor plate and said outer end of said fuel filler tube, wherein said second end portion is wider than said first end portion, and said second end portion further is sized for insertion through the first slot.

2. The apparatus of claim 1, further comprising a protective coating covering the fuel filler tube and restrictor plate, and wherein the closure means contacts the protective coating.

3. The apparatus of claim 1, wherein the first end portion of the closing means engages the second side of the restrictor plate while in its closed position, and the middle portion of the closing means engages the first side of the restrictor plate.

4. The apparatus of claim 1, wherein the closing means bears against the first side and the second side of the restrictor plate.

5. The apparatus of claim 1, wherein the closing means includes a closure plate and means for yieldably biasing the closure plate to a position blocking the opening, the biasing means extending through the first slot and engaging the restrictor plate.

6. The apparatus of claim 1, wherein the closing means includes a closure plate and means for locking the closure plate to the restrictor plate so that the closure plate is movable away from the opening during refueling but is movable to close the opening upon withdrawal of the fuel filler nozzle.

7. The apparatus of claim 6, wherein the restrictor plate is formed to include a second slot and the locking means extends through the second slot and engages the restrictor plate.

8. The apparatus of claim 6, wherein the locking means includes a locking tab engaging the second side of the restrictor plate.

9. The apparatus of claim 1, wherein the closing means further comprises a locking tab engaging the second side of the restrictor plate and an upstanding tab engaging the first side of the restrictor plate lying in spaced-apart relationship with the locking tab and cooperating with the locking tab to trap the restrictor plate therebetween.

10. The apparatus of claim 1, wherein the middle portion of the closing means passes through the first slot and a tab depending from and engaging the first side of the restrictor plate.

11. The apparatus of claim 1, wherein the closing means includes at least one support tab appended to the middle portion and arranged to extend through the first slot generally perpendicular to the restrictor plate to support the closing means for pivoting in the first slot.

12. A nozzle restrictor apparatus comprising:
a restrictor plate sized for insertion into a fuel filler tube having a first end configured to receive a fuel cap and an opposite second end, the restrictor plate being formed to include aperture means for allowing passage of a fuel filler nozzle therethrough during refueling and a first slot, said restrictor plate including a generally planar outer side and a generally planar inner side, and
a closure plate having a first end portion, a second end portion, both of said end portions residing between said inner side of said restrictor plate and said second end of said fuel filler tube, wherein said second end portion is wider than said first end portion, and a middle portion extending therebetween and passing through the first slot, said middle portion residing between said outer side of said restrictor plate, and said first end of said fuel filler tube, and
means for yieldably biasing the second end portion to a closed position thereby blocking the aperture means.

13. The apparatus of claim 12, wherein the biasing means extends through the first slot and engages the restrictor plate.

14. The apparatus of claim 13, wherein the first end portion of said closure plate engages the inner side in its closed position, the biasing means includes a middle portion passing through the first slot and a tab depending and engaging the outer side of the restrictor plate.

15. The apparatus of claim 14, wherein the biasing means further includes at least one support tab appended to the middle portion and arranged to extend through the first slot and lie in generally perpendicular relation to the restrictor plate.

16. The apparatus of claim 12, wherein the second end portion includes means for locking the closure plate to the restrictor plate.

17. The apparatus of claim 16, wherein the restrictor plate is formed to include a second slot and the locking means extends through the second slot and engages the restrictor plate.

18. The apparatus of claim 17, wherein the first end portion of said closure plate engages the inner side in its closed position, the locking means includes an upstanding tab engaging the outer side of the restrictor plate and a bent distal tip which extends through the second slot.

19. The apparatus of claim 18, wherein the locking means further includes a locking tab engaging the inner side of the restrictor plate.

20. The apparatus of claim 12, wherein the fuel filler tube includes an outer end configured to receive a fuel cap and an opposite inner end, and the restrictor plate outer side faces the outer end and the inner side faces the inner end, and the first end portion bears against the inner side and the middle portion bears against the outer end.

21. The apparatus of claim 12, further comprising a protective coating covering the fuel filler tube and restrictor plate and wherein the closure plate contacts the protective coating covering the restrictor plate.

22. The apparatus of claim 12, wherein the first end portion engages the inner side upon reading its closed position, and the middle portion includes one section passing through the first slot and another section engaging the outer side.

23. The apparatus of claim 22, wherein the restrictor plate is formed to include a second slot, the second end portion includes a distal tip, and the second end portion passes through the second slot to position the distal tip in spaced apart relation to said another section of the middle portion and to trap the restrictor plate therebetween.

24. The apparatus of claim 23, wherein the restrictor plate includes a perimeter edge and the second slot is formed to lie between the perimeter edge and the first slot.

25. The apparatus of claim 12, wherein the middle portion includes a pair of legs arranged in spaced-apart relation and a transverse section appended to the second end portion and each leg passes through the first slot and has one end appended to the first end portion and another end appended to the transverse section.

26. The apparatus of claim 25, wherein the restrictor plate includes an outer side and an inner side, the first end portion engages the inner side, and the transverse section engages the outer side.

27. The apparatus of claim 26, wherein the restrictor plate is formed to include a second slot and the second end portion passes through the second slot and includes tab means for blocking withdrawal of the second end portion through the second slot so that the closure plate is retained in a mounted position on the restrictor plate.

28. A nozzle restrictor apparatus comprising:
a restrictor plate sized for insertion into a fuel filler tube having a first end configured to receive a fuel cap and an opposite second end, the restrictor plate being formed to include an aperture means allowing passage of a fuel filler nozzle therethrough during refueling, a first slot, a second slot, an outer side facing said first end of said fuel filler tube, and an opposite inner side, and a closure plate being formed to include means for closing the aperture means, means for yieldably biasing the closure means toward the restrictor plate to close the aperture means, means for locking the closure means to the restrictor plate, wherein said locking means is wider than said biasing means, and means extending therebetween, the biasing means extending through the first slot and the locking means extending through the second slot, both the biasing means and the locking means lying between said inner side of said restrictor plate and said second end of said fuel filler tube, and the means extending between the biasing means and the locking means lying between said outer side of said restrictor plate and said first end of said fuel filler tube.

29. The apparatus of claim 29, wherein the biasing means includes a middle portion passing through the first slot and a tab depending and engaging the outer side of the restrictor plate.

30. The apparatus of claim 29, wherein the biasing means includes at least one support tab appended to the middle portion and arranged to extend through the first slot generally perpendicular to the restrictor plate to support the closure plate for pivoting in the first slot.

31. The apparatus of claim 28, wherein the biasing means includes a pair of legs arranged in spaced-apart relation and a transverse section appended to the locking means and each leg passes through the first slot and has one end appended to the closing means and another end appended to the transverse section.

32. The apparatus of claim 31, wherein the closing means engages the inner side, and the transverse section engages the outer side of the restrictor plate.

33. The apparatus of claim 28, wherein the closure means engages the inner side of the restrictor plate in its closed position, the locking means includes an upstanding tab engaging the outer side of the restrictor plate and a bent distal tip which extends through the second slot.

34. The apparatus of claim 33, wherein the locking means further includes a locking tab engaging the inner side the restrictor plate.

35. The apparatus of claim 28, further comprising a protective coating covering the fuel filler tube and the restrictor plate and wherein the closure plate contacts the protective coating covering the restrictor plate.

36. A nozzle restrictor apparatus comprising
a restrictor plate being sized for insertion into a fuel filler tube and having an aperture means allowing passage of a fuel filler nozzle therethrough, a first slot, a second slot, an outer side, and an inner side,
a closure plate having a movable portion and a fixed portion, and
means for weaving the fixed portion of the closure plate from the outer side through the first and second slots to position the movable portion of the closure plate on the inner side adjacent to the opening formed in the restrictor plate.

37. The apparatus of claim 36, wherein the fixed portion includes a spring portion and a locking portion.

38. The apparatus of claim 37, wherein the spring portion extends through the first slot and the locking portion extends through the second slot and engages the restrictor plate.

39. The apparatus of claim 38, wherein the movable portion engages the inner side of the restrictor plate in its closed position, and the locking portion includes an upstanding tab engaging the outer side of the restrictor plate and a bent distal tip extending through the second slot.

40. The apparatus of claim 39, wherein the locking portion further includes a locking tab engaging the inner side of the restrictor plate.

41. The apparatus of claim 37, wherein the movable portion engages the inner side of the restrictor plate in its closed position, and the spring portion includes a middle portion passing through the first slot and a tab depending and engaging the outer side of the restrictor plate.

42. The apparatus of claim 41, wherein the spring portion includes at least one support tab appended to the middle portion extending through the first slot and lying in generally perpendicular relation to the restrictor plate.

43. The apparatus of claim 37, wherein the spring portion includes a pair of legs arranged in spaced-apart relation and a transverse section appended to the locking portion and each leg passes through the first slot and has one end appended-to the movable portion and another end appended to the transverse section.

44. The apparatus of claim 43, wherein the movable portion engages the inner side in its closed position, and the transverse section engages the outer side.

45. The apparatus of claim 36, wherein the movable portion includes means for closing the opening, and engages the inner side of the restrictor plate in its closed position.

46. The apparatus of claim 36, further comprising a protective coating covering the fuel filler tube and the restrictor plate and wherein the weaving means contacts the protective coating covering the restrictor plate.

47. A nozzle restrictor apparatus for use in a fuel filler tube having a first end configured to receive a fuel cap and an opposite second end, the apparatus comprising:
a restrictor plate formed to include a nozzle-receiving aperture, and having an inner side and an outer side facing said first end of said fuel filler tube,
means for engaging the fuel filler tube to mount the restrictor plate in the fuel filler tube the engaging means being appended to the fuel filler tube,
means for concurrently coating the fuel filler tube, restrictor plate, and engaging means to establish a protective shell thereon,
a closure portion, and
means for supporting the closure portion having a top and bottom portion and a middle portion extending therebetween, for pivotable movement in the fuel filler tube relative to the restrictor plate having a closed position closing the nozzle-receiving aperture and an opened position opening the nozzle-receiving aperture, the supporting means engaging the protective shell wherein the top and bottom portion of the closure portion lie between the inner side of the restrictor plate and the second end of the fuel filler tube, said bottom portion being wider than said top portion, and the middle portion of the closure plate lies between the outer side of the restrictor plate and the first end of the fuel filler tube.

48. The apparatus of claim 47, wherein the restrictor plate includes a first slot and the support means extends through the first slot and engages the restrictor plate.

49. The apparatus of claim 48, wherein the closure portion engages the inner side of the restrictor plate in the closed position, the support means includes a middle portion passing through the first slot and a tab depending and engaging the outer side of the restrictor plate.

50. The apparatus of claim 49, wherein the support means further includes at least one support tab appended to the middle portion and arranged to extend through the first slot and lie perpendicular to the restrictor plate.

51. The apparatus of claim 47, wherein the support means includes a first end portion, a second end portion, and a middle portion, the second end portion includes means for locking the support means to the restrictor plate.

52. The apparatus of claim 51, wherein the restrictor plate is formed to include a second slot and the locking means extends through the second slot and engages the restrictor plate.

53. The apparatus of claim 52, wherein the restrictor plate is formed to include a first slot and a perimeter edge and the second slot is formed to lie between the perimeter edge and the first slot.

54. The apparatus of claim 53, wherein the middle portion includes a pair of legs arranged in spaced-apart relation and a transverse section appended to the second end portion and each leg passes through the first slot and has one end appended to the first end portion and another end appended to the transverse section.

55. The apparatus of claim 54, wherein the first end portion of the support means engages the inner side of the restrictor plate, and the transverse section engages the outer side of the restrictor plate.

56. The apparatus of claim 52, wherein the locking means includes an upstanding tab engaging the outer side of the restrictor plate and a bent distal tip which extends through the second slot.

57. The apparatus of claim 56, wherein the locking means further includes a locking tab engaging the inner side of the restrictor plate.

58. The apparatus of claim 51, wherein the restrictor plate is formed to include a second slot, the second end portion includes a distal tip, and the second end portion passes through the second slot to position the distal tip in spaced apart relation to the middle portion to trap the restrictor plate therebetween.

59. The apparatus of claim 51, wherein the restrictor plate is formed to include a second slot and the second end portion passes through the second slot and includes tab means for blocking withdrawal of the second end portion through the second slot so that the support means is retained in a mounted position on the restrictor plate.

60. The apparatus of claim 47, wherein the fuel filler tube includes an outer end configured to receive a fuel cap and an opposite inner end, the restrictor plate includes an outer side facing the outer end and an inner side facing the inner end, and the closure portion bears against the inner side in the closed position and the support means bears against the outer end and the inner end.

61. The apparatus of claim 47, wherein the restrictor plate is formed to include a first slot, an outer side and an inner side, the closure portion engages the inner side in the closed position, and the support means includes a middle portion passing through the first slot and a transverse portion engaging the outer side.

62. A nozzle restrictor apparatus for use in a fuel filler tube, the apparatus comprising
means for partitioning the fuel filler tube to define a nozzle-receiving outer chamber and an inner chamber, the partitioning means including a restrictor plate formed to include a nozzle-receiving aperture and means for mounting the restrictor plate in the fuel filler tube, so that the nozzle-receiving aperture provides a passage between the outer and inner chambers, the restrictor plate also being formed to include an upper slot, a lower slot between the nozzle-receiving aperture and the upper slot, an inner segment between the lower slot and the nozzle-receiving aperture, an outer segment between the upper slot and the fuel filler tube, an outer side lying in the outer chamber, and an inner side lying in the inner chamber,
means for normally closing the nozzle-receiving aperture, the closing means including a foot portion situated in the upper slot formed in the restrictor plate, a body portion situated in the lower slot, and a head portion lying in the inner chamber, the body portion interconnecting the foot portion and the head portion and including first grip means for gripping the inner segment, the foot portion including second grip means for gripping the outer segment, and the head portion including a closure portion and means for yieldably biasing the closure portion toward a closed position covering the nozzle-receiving aperture so that a fuel filler nozzle inserted into the inner chamber through the nozzle-receiving opening moves the closure portion against the biasing means toward an opened position opening the nozzle-receiving aperture.

63. The apparatus of claim 62, wherein the first grip means includes a middle portion passing through the first slot and a tab depending and engaging the outer side of the restrictor plate.

64. The apparatus of claim 63, wherein the first grip means further includes at least one support tab appended to the middle portion and arranged to extend through the lower slot and lie perpendicular to the restrictor plate.

65. The apparatus of claim 63, wherein the body includes a transverse section appended to the foot portion, the middle portion includes at least one leg and passing through the lower slot and has one end appended to the head portion and another end appended to the transverse section.

66. The apparatus of claim 65, wherein the head portion engages the inner side in the closed position, and the transverse section engages the outer side.

67. The apparatus of claim 62, wherein the second grip means includes an upstanding tab engaging the outer side of the outer segment and a bent distal tip which extends through the upper slot.

68. The apparatus of claim 67, wherein the second grip means further includes a locking tab engaging the inner side of the outer segment.

69. The apparatus of claim 62, wherein the second grip means includes a distal tip, and the second grip means passes through the upper slot to position the distal tip in spaced apart relation to the body portion to trap the restrictor plate therebetween.

70. The apparatus of claim 62, wherein the second grip means passes through the upper slot and includes tab means for blocking withdrawal of the foot portion through the upper slot so that the closing means is retained in a mounted position on the restrictor plate.

* * * * *

UNITED STATES PATENT AND TRADEMARK OFFICE
CERTIFICATE OF CORRECTION

PATENT NO. : 5,385,179
DATED : January 31, 1995
INVENTOR(S) : Dale Bates, Daniel N. Smith, Richard F. Little It is certified that error appears in the above-indentified patent and that said Letters Patent is hereby corrected as shown below:

Column 9, line 48 after "side" please insert --of--.

Column 10, line 27, please delete "appended-to" and insert --appended to--.

Signed and Sealed this

Nineteenth Day of September, 1995

Attest:

BRUCE LEHMAN

Attesting Officer    Commissioner of Patents and Trademarks